(No Model.)
G. A. NAUMANN.
BAKER'S PEEL.
No. 405,046. Patented June 11, 1889.
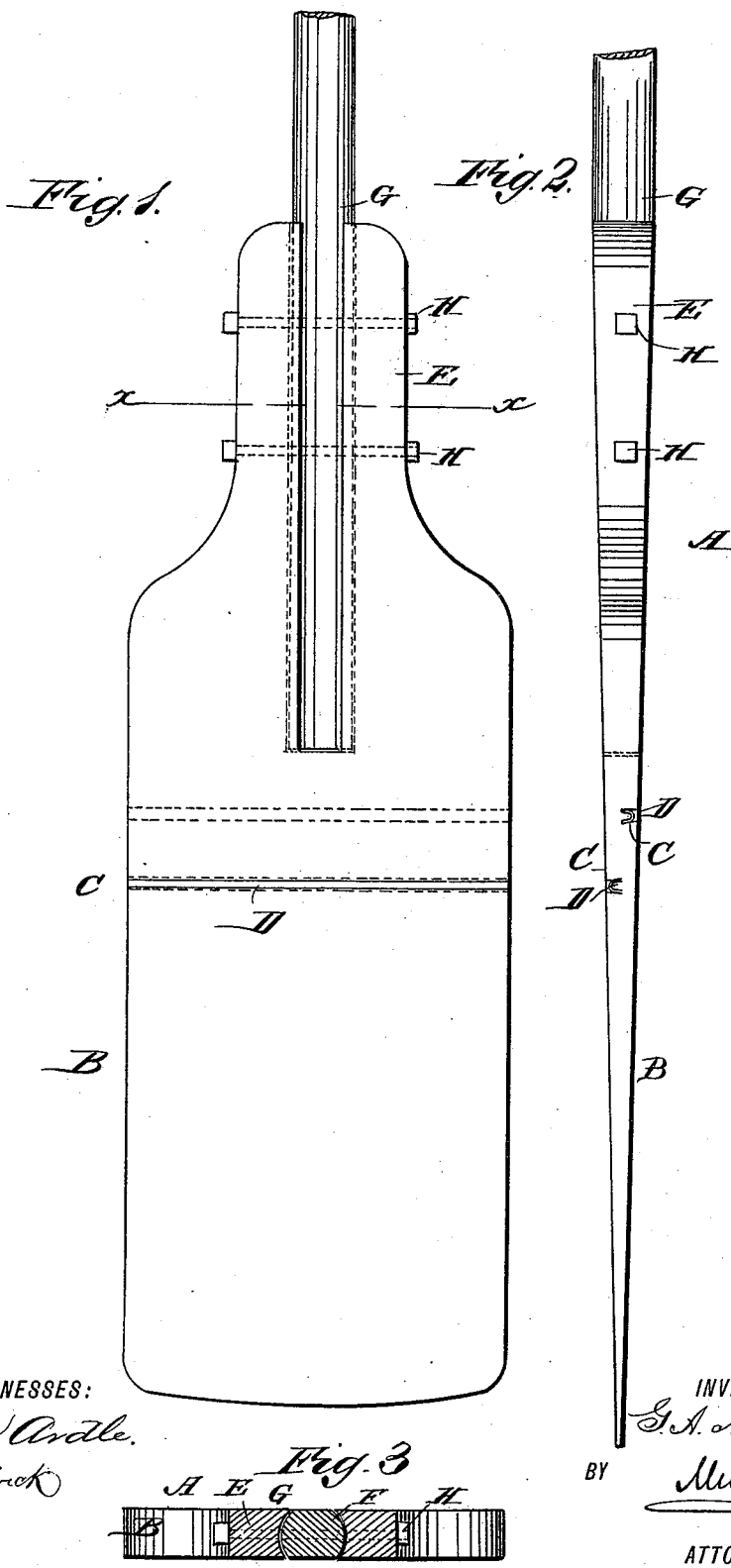
WITNESSES:
F. McArdle
C. Sedgwick
INVENTOR:
G. A. Naumann
BY Munn & Co
ATTORNEYS.

UNITED STATES PATENT OFFICE.

GUSTAV A. NAUMANN, OF NEW YORK, N. Y.

BAKER'S PEEL.

SPECIFICATION forming part of Letters Patent No. 405,046, dated June 11, 1889.

Application filed November 14, 1888. Serial No. 290,828. (No model.)

*To all whom it may concern:*

Be it known that I, GUSTAV A. NAUMANN, of New York, in the county and State of New York, have invented a new and Improved Baker's Peel, of which the following is a full, clear, and exact description.

The object of the invention is to provide a new and improved baker's peel which is simple and durable in construction and is prevented from warping.

The invention consists of a blade provided with transversely-extending metallic ribs.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a side elevation of the same, and Fig. 3 is a sectional end elevation of the same on the line x x of Fig. 1.

The improved baker's peel A is provided with the blade B, having on one or both sides a transversely-extending groove C, into which fits a metallic rib D, preferably U-shaped, as illustrated in Fig. 2, and flush with the surface of the blade B. The remaining opening on top of the rib D is filled in with putty or other suitable substance, so that the entire surface of the blade B is even. The metallic ribs D thus embedded in the blade B prevent the latter from warping, which so frequently occurs in other blades when subjected to the heat of the oven. The blade B is otherwise of the usual wedge shape, and is provided on its handle end E with a bored-out recess F, into which fits the round handle G, secured to the handle end E by means of bolts H, passing transversely through the handle end E and the handle G.

By boring the recess F an easy fitting of the handle G into the blade B is accomplished, and at the same time a very secure fastening of the blade B to the handle G is established.

Having thus fully described my invention, I claim as new and desire to secure by Letters Patent—

1. A baker's peel having its blade provided with transversely-extending ribs embedded therein and serving to prevent the blade from warping, substantially as described.

2. A baker's peel consisting of a wooden blade having transversely-extending and U-shaped ribs embedded in opposite sides of the same, substantially as described.

3. The herein-described baker's peel, consisting of the wooden blade B, having the recess F in its upper end and the transversely-extending grooves C in opposite sides, the metal ribs D, secured in the grooves, and the handle G, secured in the said recess, as specified.

GUSTAV A. NAUMANN.

Witnesses:
  THEO. G. HOSTER,
  C. SEDGWICK.